US011898583B2

(12) United States Patent
Nagura et al.

(10) Patent No.: US 11,898,583 B2
(45) Date of Patent: Feb. 13, 2024

(54) GAS CYLINDER

(71) Applicant: SMC CORPORATION, Chiyoda-ku (JP)

(72) Inventors: Seiichi Nagura, Moriya (JP); Naoki Shinjo, Nagareyama (JP); Kazutaka Someya, Kashiwa (JP); Akihiro Kazama, Moriya (JP); Yusuke Mori, Moriya (JP)

(73) Assignee: SMC CORPORATION, Chiyoda-ku (JP)

( * ) Notice: Subject to any disclaimer, the term of this patent is extended or adjusted under 35 U.S.C. 154(b) by 0 days.

(21) Appl. No.: 17/761,456

(22) PCT Filed: Jul. 20, 2020

(86) PCT No.: PCT/JP2020/027995
§ 371 (c)(1),
(2) Date: Mar. 17, 2022

(87) PCT Pub. No.: WO2021/053959
PCT Pub. Date: Mar. 25, 2021

(65) Prior Publication Data
US 2022/0364579 A1 Nov. 17, 2022

(30) Foreign Application Priority Data
Sep. 20, 2019 (JP) ................................ 2019-171018

(51) Int. Cl.
*F15B 15/22* (2006.01)
*F15B 15/14* (2006.01)
*F15B 15/20* (2006.01)

(52) U.S. Cl.
CPC .......... *F15B 15/22* (2013.01); *F15B 15/1433* (2013.01); *F15B 15/204* (2013.01);
(Continued)

(58) Field of Classification Search
CPC ...... F15B 15/22; F15B 15/204; F15B 15/222; F15B 15/1433; F15B 15/14;
(Continued)

(56) References Cited

U.S. PATENT DOCUMENTS 3,122,063 A * 2/1964 Chorkey ............... F15B 15/223 91/394
3,238,850 A * 3/1966 Desmarchelier ...... F15B 15/223 91/394

(Continued)

FOREIGN PATENT DOCUMENTS

JP 37-25908 Y1 9/1962
JP 61-141804 U 9/1986

(Continued)

OTHER PUBLICATIONS

International Search Report dated Sep. 24, 2020 in PCT/JP2020/027995 filed on Jul. 20, 2020 (3 pages).

*Primary Examiner* — Dustin T Nguyen
(74) *Attorney, Agent, or Firm* — Oblon, McClelland, Maier & Neustadt, L.L.P.

(57) ABSTRACT

In a cushion mechanism of a gas cylinder, when the pressure of a gas in a first pressure chamber is less than or equal to a prescribed pressure, a valve body cuts off communication between the upstream side and downstream side of a discharge flow passage by mean of the biasing force of a spring member. In addition, when the pressure of the gas exceeds the prescribed pressure, the valve body is displaced to the downstream side of the discharge flow passage against the biasing force, thereby enabling communication between the upstream side and the downstream side of the discharge flow passage.

11 Claims, 11 Drawing Sheets

(52) U.S. Cl.
CPC ............ *F15B 15/222* (2013.01); *F15B 15/14* (2013.01); *F15B 15/1428* (2013.01); *F15B 2211/715* (2013.01); *F15B 2211/8855* (2013.01)

(58) Field of Classification Search
CPC .............. F15B 15/1428; F15B 15/1457; F15B 2211/715; F15B 2211/8855; F15B 2211/50509; F15B 2211/7053
See application file for complete search history.

(56) References Cited

U.S. PATENT DOCUMENTS

| | | | | |
|---|---|---|---|---|
| 3,247,767 | A * | 4/1966 | Aslan | F16K 47/16 251/215 |
| 3,913,451 | A * | 10/1975 | McDonald | F15B 15/222 91/396 |
| 6,038,956 | A * | 3/2000 | Lane | F15B 15/222 91/452 |
| 11,421,716 | B2 * | 8/2022 | Takakuwa | F15B 15/22 |
| 2003/0140781 | A1 * | 7/2003 | Weiss | F15B 15/222 92/85 B |

FOREIGN PATENT DOCUMENTS

| | | | |
|---|---|---|---|
| JP | 62-177904 | U1 | 11/1987 |
| JP | 63-8405 | U | 1/1988 |
| JP | 6-341411 | A | 12/1994 |
| JP | 2002-130214 | A | 5/2002 |
| JP | 3466121 | B2 | 11/2003 |
| JP | 2006-152010 | A | 6/2006 |
| JP | 2016-156446 | A | 9/2016 |

* cited by examiner

GAS CYLINDER

TECHNICAL FIELD

The present invention relates to a gas cylinder equipped with a cushioning mechanism that brakes movement of a piston when stopped at a stroke end.

BACKGROUND ART

Conventionally, for example, as disclosed in JP S61-141804 U, JP S63-008405 U, JP H06-341411 A, and JP 3466121 B2, a cushioning mechanism has been provided in a gas cylinder in order to alleviate shocks occurring at a stoke end of the piston. In these publications, it is disclosed that a throttle valve is incorporated in a cover of the gas cylinder, and by manually adjusting a degree of opening of the throttle valve in accordance with usage conditions of the gas cylinder such as the piston speed (cylinder speed) or the like, the amount of gas discharged from a pressure chamber (cushion chamber) between the stroke end and the piston is adjusted via the throttle valve.

SUMMARY OF THE INVENTION

Incidentally, in the case of operating production equipment in which a plurality of gas cylinders having the same structure are installed, it is necessary to manually adjust the throttle valve for each of the gas cylinders, and therefore, the burden imposed on a person in charge of the production equipment is increased.

Further, the manual adjustment of the throttle valves is entrusted to the person in charge. Moreover, since the degree of opening of the throttle valves is manually adjusted by a screw type adjustment mechanism, daily maintenance is required such as confirming the presence or absence of looseness of the screws due to vibrations or the like in the production equipment. As a result, it is necessary to repeatedly carry out such manual adjustment.

Furthermore, since it is necessary for the throttle valve to be incorporated within a limited space inside the cover, it is impossible to increase the cross-sectional area of the gas flow path.

Further still, in the case that the cylinder speed is of a high speed specification, by manually adjusting the degree of opening of the throttle valve and throttling the amount of gas that is discharged, the cylinder speed on the stroke end side can be reduced. Consequently, the pressure in the cushion chamber becomes higher than the pressure on the pressurizing chamber side, and a bouncing phenomenon occurs in which the piston is pushed back in a direction opposite to the forward moving direction. As a result, a cycle time is lengthened and a loss is generated in the production equipment.

The present invention has been devised taking into consideration the aforementioned problems, and has the object of providing a gas cylinder by which a need for manual adjustment is rendered unnecessary, and which is capable of realizing a smooth arrival of the piston at a stroke end and alleviating shocks on the piston while suppressing the occurrence of a bouncing phenomenon.

An aspect of the present invention relates to a gas cylinder comprising a cylinder tube in which a cylinder chamber is formed, a first cover configured to close one end of the cylinder tube, a second cover configured to close another end of the cylinder tube, a piston configured to partition the cylinder chamber into a first pressure chamber on a side of the first cover and a second pressure chamber on a side of the second cover, and to slide in the cylinder chamber, a piston rod connected to the piston, a first port configured to supply and discharge gas to and from the first pressure chamber, a second port configured to supply and discharge gas to and from the second pressure chamber, and a cushioning mechanism configured to brake movement of the piston when the piston comes to a stop at a stroke end at least on the side of the first cover.

The cushioning mechanism includes a communication blocking portion configured to block a state of communication between the first pressure chamber and the first port when the piston comes close to the stroke end, an orifice member disposed in the first cover and configured to discharge gas in the first pressure chamber, and a discharge flow rate adjustment part disposed in the first cover and configured to discharge the gas from the first pressure chamber in cooperation with the orifice member, in a case that a pressure in the first pressure chamber exceeds a predetermined pressure.

The discharge flow rate adjustment part includes a discharge flow path formed inside the first cover and configured to discharge the gas in the first pressure chamber, a spool type valve element disposed midway along the discharge flow path, and an elastic body configured to bias the valve element toward an upstream side of the discharge flow path.

In addition, in the case that the pressure is less than or equal to the predetermined pressure, the valve element blocks a state of communication between an upstream side and a downstream side of the discharge flow path. Further, in the case that the pressure exceeds the predetermined pressure, the valve element is displaced by the pressure toward a downstream side of the discharge flow path in opposition to the biasing force, whereby the upstream side and the downstream side of the discharge flow path are allowed to communicate with each other.

According to the present invention, in the case that the pressure in the first pressure chamber (the cushion chamber) is less than or equal to a predetermined pressure, since the valve element blocks the state of communication between the upstream side and the downstream side of the discharge flow path due to the biasing force from the elastic body, the gas in the cushion chamber is discharged only through the orifice member. Further, in the case that the pressure in the first pressure chamber exceeds the predetermined pressure, the valve element is displaced by the pressure in opposition to the biasing force, and allows the upstream side and the downstream side of the discharge flow path to communicate with each other, whereby the gas in the first pressure chamber is discharged through the orifice member and is also discharged through the discharge flow path.

In this manner, in the case that the pressure exceeds the predetermined pressure, the gas in the first pressure chamber is discharged through two routes. Consequently, since the gas in the first pressure chamber is discharged in a short time period, the piston can be made to arrive at the stroke end rapidly and smoothly. As a result, while avoiding the occurrence of a bouncing phenomenon, the responsiveness of the gas cylinder can be improved.

Further, due to the valve element being displaced by a balance between the biasing force of the elastic body and the pressure in the first pressure chamber, the upstream side and the downstream side of the discharge flow path are switched into a state of communication or into a blocked state. Consequently, manual adjustment of the valve element is rendered unnecessary. More specifically, since the valve element is a spool type valve element, in the case that the upstream side and the downstream side of the discharge flow path are placed in communication, the degree of opening of the valve element can be gradually changed in accordance with the magnitude of the pressure in the first pressure chamber.

Accordingly, with the present invention, the need for manual adjustment of the valve element is rendered unnecessary, and it becomes possible to realize a smooth arrival of the piston at the stroke end and alleviate shocks on the piston while suppressing the occurrence of a bouncing phenomenon.

DESCRIPTION OF THE INVENTION

Hereinafter, preferred embodiments concerning a gas cylinder according to the present invention will be illustrated and described with reference to the accompanying drawings.

1. First Embodiment

1.1 Configuration of the First Embodiment

Figure 1:
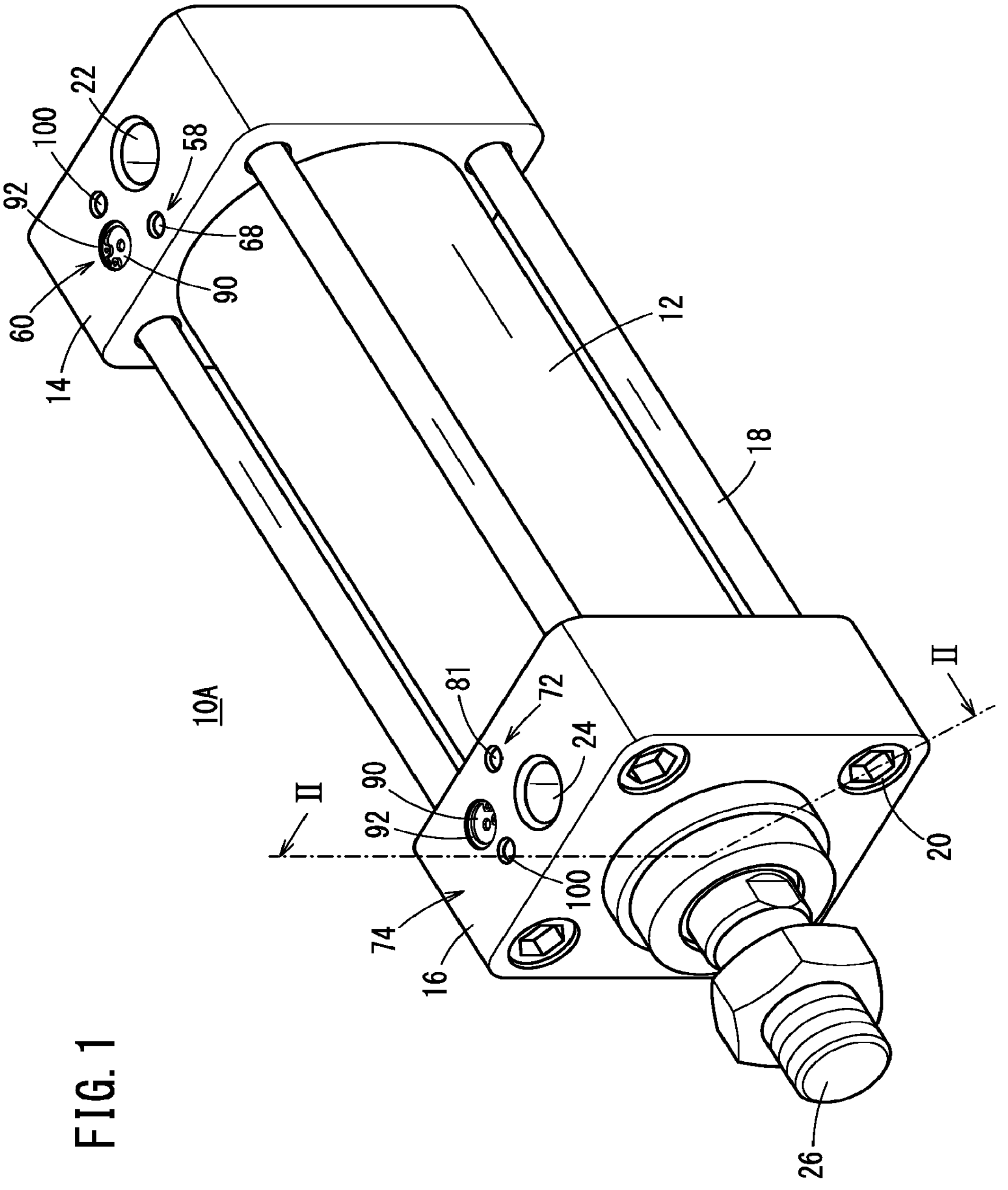
FIG. 1 is a perspective view of a gas cylinder according to a first embodiment.

As shown in FIG. 1, a gas cylinder 10A according to a first embodiment is equipped with a cylindrical cylinder tube 12, a head cover 14 that seals (closes) one end of the cylinder tube 12, and a rod cover 16 that seals (closes) another end of the cylinder tube 12. The cylinder tube 12, the head cover 14, and the rod cover 16 are connected in an axial direction of the gas cylinder 10A by a plurality of connecting rods 18 and connecting bolts 20. A head side port 22 is formed on an upper surface (one surface) of the head cover 14. A rod side port 24 is formed on an upper surface (another surface) of the rod cover 16. A piston rod 26 projects and extends out from the rod cover 16. The axial direction of the gas cylinder 10A refers to a direction in which the piston rod 26 extends.

Figure 2:
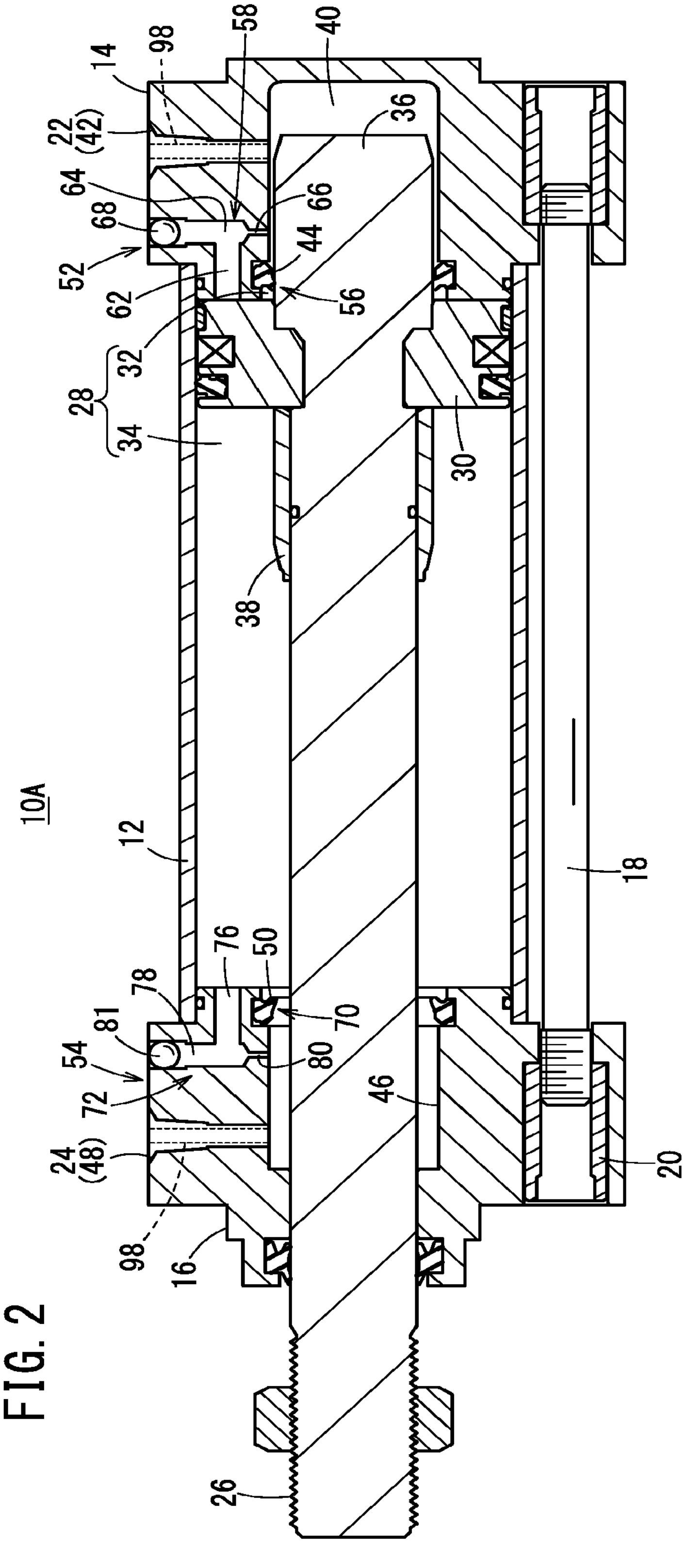
FIG. 2 is a cross-sectional view taken along line II-II of FIG. 1.

As shown in FIG. 2, a cylinder chamber 28 is formed inside the cylinder tube 12. In the cylinder chamber 28, a piston 30 is arranged which slides in the axial direction between a stroke starting end (stroke end) on the head cover 14 side and a stroke terminal end (stroke end) on the rod cover 16 side. The piston 30 divides the cylinder chamber 28 into a head side pressure chamber 32 on the head cover 14 side and a rod side pressure chamber 34 on the rod cover 16 side (see FIGS. 2 and 5A).

The piston rod 26 is connected to the piston 30. One end of the piston rod 26 is connected to the piston 30. Another end of the piston rod 26 penetrates through the rod cover 16 and projects out to the exterior. A head side cushion pin 36 is connected to the head cover 14 side of the piston 30. On the rod cover 16 side of the piston 30, a rod side cushion pin 38 is mounted on the outer peripheral surface of the piston rod 26.

A concave head cover chamber 40, into which the head side cushion pin 36 is inserted when the piston 30 comes close to the stroke starting end, is formed in the head cover 14. A through hole 42, which penetrates upward through the interior of the head cover 14, is formed on a rear inner side of the head cover chamber 40. The head side port 22 is formed by the through hole 42. Accordingly, the head side port 22 carries out supply and discharge of gas to and from the head side pressure chamber 32 via the head cover chamber 40. On the piston 30 side of the head cover chamber 40, a cushion packing 44 such as an O-ring or the like is provided, which is placed in sliding contact with the head side cushion pin 36 that is inserted into the head cover chamber 40.

A concave rod cover chamber 46, into which the rod side cushion pin 38 is inserted when the piston 30 comes close to the stroke terminal end, is formed in the rod cover 16. A through hole 48, which penetrates upward through the interior of the rod cover 16, is formed on a rear inner side of the rod cover chamber 46. The rod side port 24 is formed by the through hole 48. Accordingly, the rod side port 24 carries out supply and discharge of gas to and from the rod side pressure chamber 34 via the rod cover chamber 46. On the piston 30 side of the rod cover chamber 46, a cushion packing 50 such as an O-ring or the like is provided, which is placed in sliding contact with the rod side cushion pin 38 that is inserted into the rod cover chamber 46.

Moreover, the gas supplied to and discharged from the head side pressure chamber 32 and the rod side pressure chamber 34 is air, for example. Accordingly, the gas cylinder 10A according to the first embodiment is applied, for example, to an air cylinder.

A head side cushioning mechanism 52 that brakes movement of the piston 30 when the piston 30 comes to a stop at the stroke starting end is provided on the head cover 14 side of the gas cylinder 10A. Further, a rod side cushioning mechanism 54 that brakes movement of the piston 30 when the piston 30 comes to a stop at the stroke terminal end is provided on the rod cover 16 side of the gas cylinder 10A.

Moreover, in the gas cylinder 10A, the cushioning mechanism may be provided on at least one of the head cover 14 side or the rod cover 16 side. Further, when the piston 30 comes to a stop at the stroke end (the stroke starting end or the stroke terminal end), a space between the piston 30 and the stroke end (the head side pressure chamber 32 or the rod side pressure chamber 34) serves as a cushion chamber.

The head side cushioning mechanism 52 includes a communication blocking portion 56 that blocks a state of communication between the head side pressure chamber 32 and the head side port 22 when the piston 30 comes close to the stroke starting end, an orifice member 58 which is disposed in the head cover 14 and through which gas in the head side pressure chamber 32 is discharged, and a discharge flow rate adjustment part 60 (see FIGS. 1, 3A, and 3B) which is disposed in the head cover 14, and discharges the gas from the head side pressure chamber 32 in cooperation with the orifice member 58, in the case that the pressure in the head side pressure chamber 32 exceeds a predetermined pressure. As shown in FIGS. 1 to 3B, the orifice member 58 and the discharge flow rate adjustment part 60 are disposed inside the head cover 14 on an upper side (one side portion) with respect to the piston rod 26, so as to be aligned in a direction perpendicular to the axial direction as viewed in plan.

In the head side cushioning mechanism 52, the communication blocking portion 56 is defined by the head side cushion pin 36 and the cushion packing 44. By the head side cushion pin 36 and the cushion packing 44 being placed in sliding contact with each other, the state of communication between the head side pressure chamber 32 and the head side port 22 is blocked. Further, in the head side cushioning mechanism 52, the orifice member 58 is formed from an upstream side flow path 62 that communicates with the head side pressure chamber 32 and extends in the axial direction inside the head cover 14, a downstream side flow path 64 connected to a downstream side of the flow path 62, and extending in a vertical direction inside the head cover 14, and an orifice 66 that allows a lower side of the flow path 64 and the head cover chamber 40 to communicate with each other, and is smaller in diameter than the flow path. An upper end of the flow path 64 that extends in the vertical direction is sealed by a steel ball 68. Accordingly, in the case that the state of communication between the head side pressure chamber 32 and the head side port 22 is blocked, the gas in the head side pressure chamber 32 is discharged through the head cover chamber 40 and the head side port 22 from the orifice 66 and each of the flow paths 62 and 64.

The rod side cushioning mechanism 54 includes a communication blocking portion 70 that blocks a state of communication between the rod side pressure chamber 34 and the rod side port 24 when the piston 30 comes close to the stroke terminal end, an orifice member 72 which is disposed in the rod cover 16 and through which gas is discharged from the rod side pressure chamber 34, and a discharge flow rate adjustment part 74 (see FIGS. 1, 3A, and 3B) which is disposed in the rod cover 16, and discharges the gas from the rod side pressure chamber 34 in cooperation with the orifice member 72, in the case that the pressure in the rod side pressure chamber 34 exceeds a predetermined pressure. As shown in FIGS. 1 to 3B, the orifice member 72 and the discharge flow rate adjustment part 74 are disposed inside the rod cover 16 on an upper side (one side portion) with respect to the piston rod 26, so as to be aligned in a direction perpendicular to the axial direction as viewed in plan.

In the rod side cushioning mechanism 54, the communication blocking portion 70 is defined by the rod side cushion pin 38 and the cushion packing 50. By the rod side cushion pin 38 and the cushion packing 50 being placed in sliding contact with each other, the state of communication between the rod side pressure chamber 34 and the rod side port 24 is blocked. Further, in the rod side cushioning mechanism 54, the orifice member 72 is formed from an upstream side flow path 76 that communicates with the rod side pressure chamber 34 and extends in the axial direction inside the rod cover 16, a downstream side flow path 78 connected to a downstream side of the flow path 76, and extending in a vertical direction inside the rod cover 16, and an orifice 80 that allows a lower side of the flow path 78 and the rod cover chamber 46 to communicate with each other, and is smaller in diameter than the flow path 78. An upper end of the flow path 78 that extends in the vertical direction is sealed by a steel ball 81. Accordingly, in the case that the state of communication between the rod side pressure chamber 34 and the rod side port 24 is blocked, the gas in the rod side pressure chamber 34 is discharged through the rod cover chamber 46 and the rod side port 24 from the orifice 80 and each of the flow paths 76 and 78.

In the head side cushioning mechanism 52 and the rod side cushioning mechanism 54, the configurations of the discharge flow rate adjustment parts 60 and 74 are substantially the same. Therefore, in the description that follows, primarily, the discharge flow rate adjustment part 74 of the rod side cushioning mechanism 54 will be described with reference to FIGS. 3A to 4B.

The discharge flow rate adjustment part 74 includes a discharge flow path 82 formed inside the rod cover 16 and configured to discharge the gas in the rod side pressure chamber 34 to the exterior, a spool type valve element 84 disposed midway along the discharge flow path 82, and a spring member 86 (elastic body) that biases the valve element 84 toward the upstream side of the discharge flow path 82.

The discharge flow path 82 is formed from a first flow path 82*a* that communicates with the rod side pressure chamber 34, and extends in the axial direction inside the rod cover 16, a second flow path 82*b* that extends upward from a downstream side of the first flow path 82*a*, a third flow path 82*c* that extends upward from a downstream side of the second flow path 82*b* and is greater in diameter than the second flow path 82*b*, and a fourth flow path 82*d* connected to the third flow path 82*c*, and extending in the axial direction. Accordingly, a connected portion between the second flow path 82*b* and the third flow path 82*c* is formed in a stepped shape.

A passage 83 extending from the rod side pressure chamber 34 toward the third flow path 82*c* is formed inside the rod cover 16 substantially coaxially with the fourth flow path 82*d*. The passage 83 serves as a locator hole in order to form the fourth flow path 82*d* with a drill or the like, and is sealed by a steel ball 85.

A tapered portion 88, the diameter of which is reduced from the third flow path 82*c* toward the second flow path 82*b*, is formed at the location of a connected portion between the second flow path 82*b* and the third flow path 82*c*, within the inner peripheral surface of the rod cover 16.

The third flow path 82*c* is sealed by a lid portion 90. The lid portion 90 is fixed to the rod cover 16 by a retaining clip 92. Moreover, a male thread 94 may be formed on the outer peripheral surface of the lid portion 90. In this case, a female thread 96, which is screw-engaged with the male thread 94, is formed at the location of the third flow path 82*c*, within the inner peripheral surface of the rod cover 16.

Figure 3A:
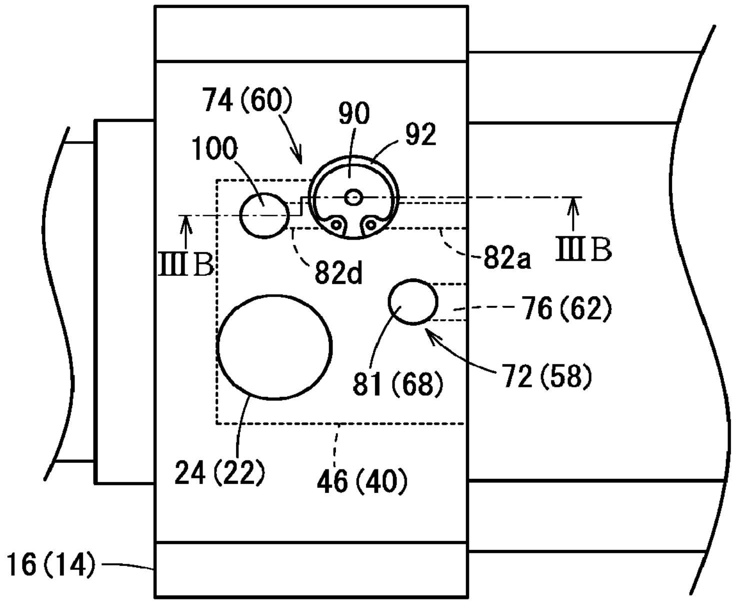
FIG. 3A is a partial plan view of the vicinity of a rod cover of the gas cylinder shown in FIG. 1.
Figure 3B:
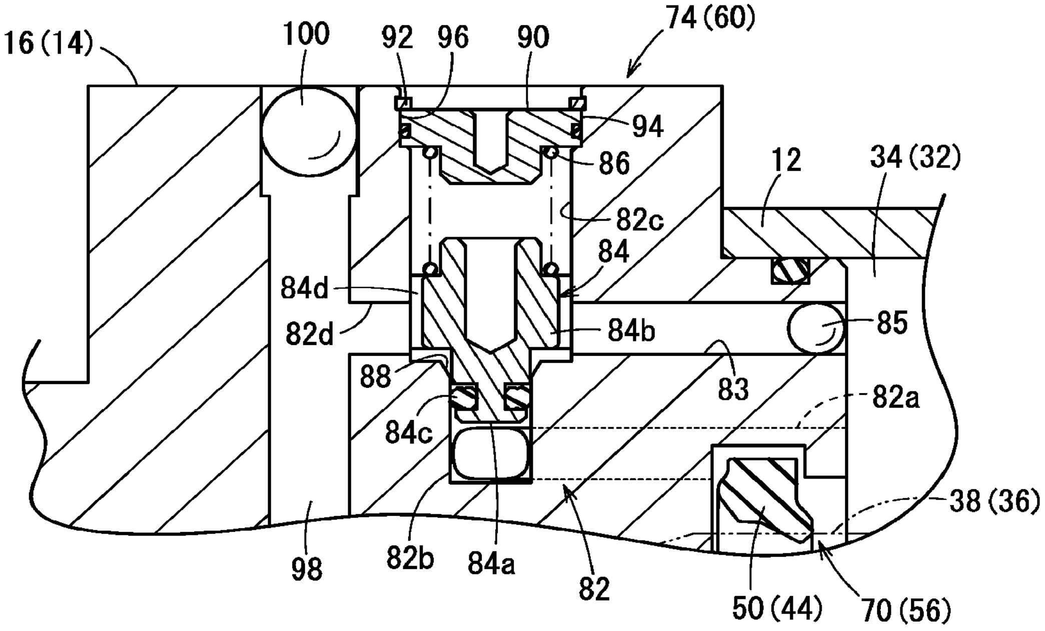
FIG. 3B is a cross-sectional view of principal components taken along line IIIB-IIIB of FIG. 3A.
Figure 4A:
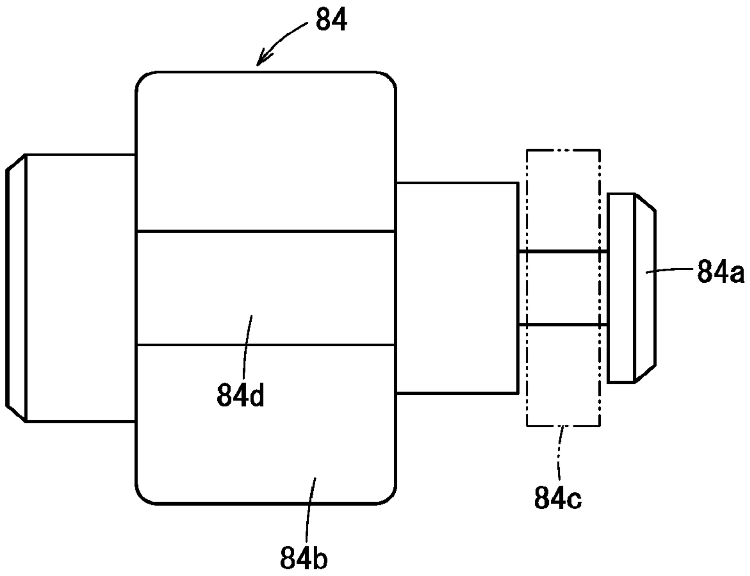
FIG. 4A is a side view of a valve element.
Figure 4B:
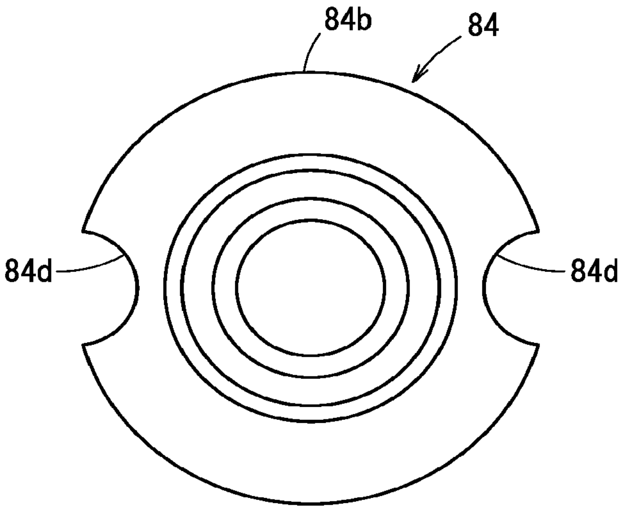
FIG. 4B is a plan view of the valve element.

The valve element 84 is a columnar shaped spool valve, which is arranged from the second flow path 82*b* toward the third flow path 82*c*, and includes a stepped portion. The valve element 84 is formed from a small diameter portion 84*a* that is capable of being inserted into the second flow path 82*b*, and a large diameter portion 84*b*, which is connected to the small diameter portion 84*a*, is arranged in the third flow path 82*c*, and the diameter of which is greater than the diameter of the small diameter portion 84*a*. The outer peripheral surface of the small diameter portion 84*a* is provided with a seal member 84*c* such as an O-ring or the like, which is in sliding contact with a location that forms the second flow path 82*b*, within the inner peripheral surface of the rod cover 16. Further, the large diameter portion 84*b* is placed in sliding contact with a location that forms the third flow path 82*c*, within the inner peripheral surface of the rod cover 16. A slit 84*d* is formed on the outer peripheral surface of the large diameter portion 84*b* along the vertical direction, which is the direction in which the valve element 84 is displaced. FIGS. 3B, 4A, and 4B show an exemplary case in which two slits 84*d* are provided. Moreover, a distal end part of the small diameter portion 84*a* may be formed in a flat shape as shown in FIGS. 3B and 4A, or may be formed in a needle-like shape.

The spring member 86 is inserted between the lid portion 90 and the valve element 84 in the third flow path 82*c*. The spring member 86 biases the large diameter portion 84*b* downward (toward the second flow path 82*b* side).

The fourth flow path 82*d* extends in the axial direction from the large diameter portion 84*b* side of the third flow path 82*c*, and communicates with a flow path 98 that extends upward from the rod cover chamber 46 (see FIGS. 2 and 3B). An upper end of the flow path 98 is sealed by a steel ball 100. The fourth flow path 82*d* communicates with the rod side port 24 via the flow path 98 and the rod cover chamber 46.

The discharge flow rate adjustment part 74 of the rod side cushioning mechanism 54 has been described above. Concerning the discharge flow rate adjustment part 60 of the head side cushioning mechanism 52, merely by changing the terminology of "rod" to "head," an explanation can be given in relation to the discharge flow rate adjustment part 60.

1.2 Operations of the First Embodiment

A description will be given concerning operations of the gas cylinder 10A according to the first embodiment which is configured in the manner described above. In this instance, a description will be given concerning operations of the rod side cushioning mechanism 54 (cushioning mechanism) in the case that the piston 30 arrives at the stroke terminal end (stroke end) on the rod cover 16 (first cover) side.

Figure 7:
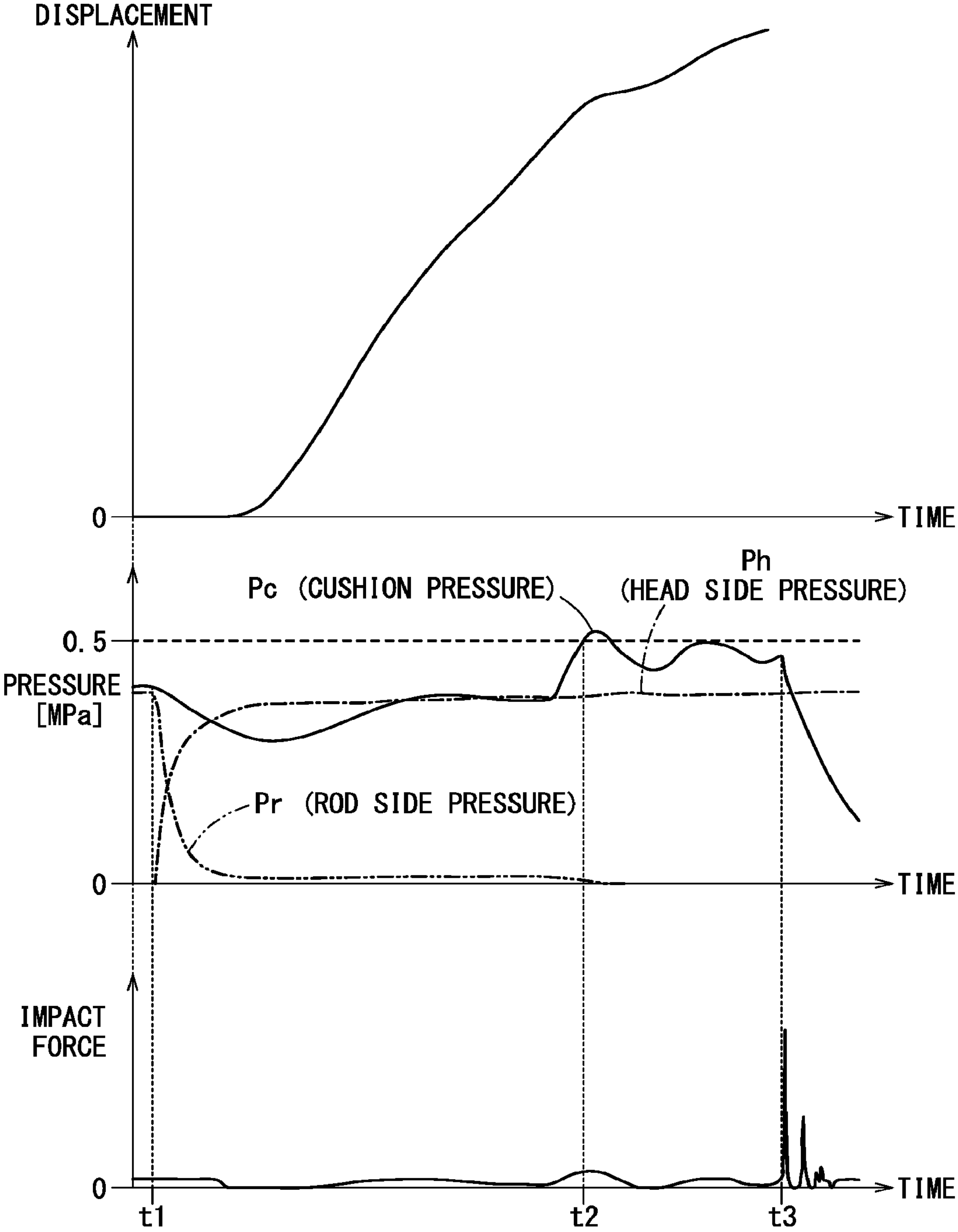
FIG. 7 is a timing chart showing operations of the gas cylinder shown in FIG. 1.

First, at time t1 in FIG. 7, supply of the gas from the head side port 22 (second port) to the head side pressure chamber 32 (second pressure chamber) via the head cover chamber 40 is initiated, together with discharging of the gas from the rod side pressure chamber 34 (first pressure chamber) via the rod cover chamber 46 and the rod side port 24 (first port) being initiated. In FIG. 7, Ph indicates the pressure (head side pressure) of the gas supplied from the head side port 22 to the head side pressure chamber 32. Pr indicates the pressure (rod side pressure) of the gas discharged from the rod side port 24. Pc indicates the pressure (cushion pressure) in the rod side pressure chamber 34.

In this case, the pressure Ph increases along with the passage of time from time t1, whereas the pressure Pr decreases. On the other hand, the pressure Pc decreases temporarily, but generally is maintained at a predetermined pressure.

Consequently, the piston 30 is displaced in the axial direction toward the rod cover 16 side, and the piston rod 26 projects out in the axial direction from the rod cover 16.

Figure 5A:
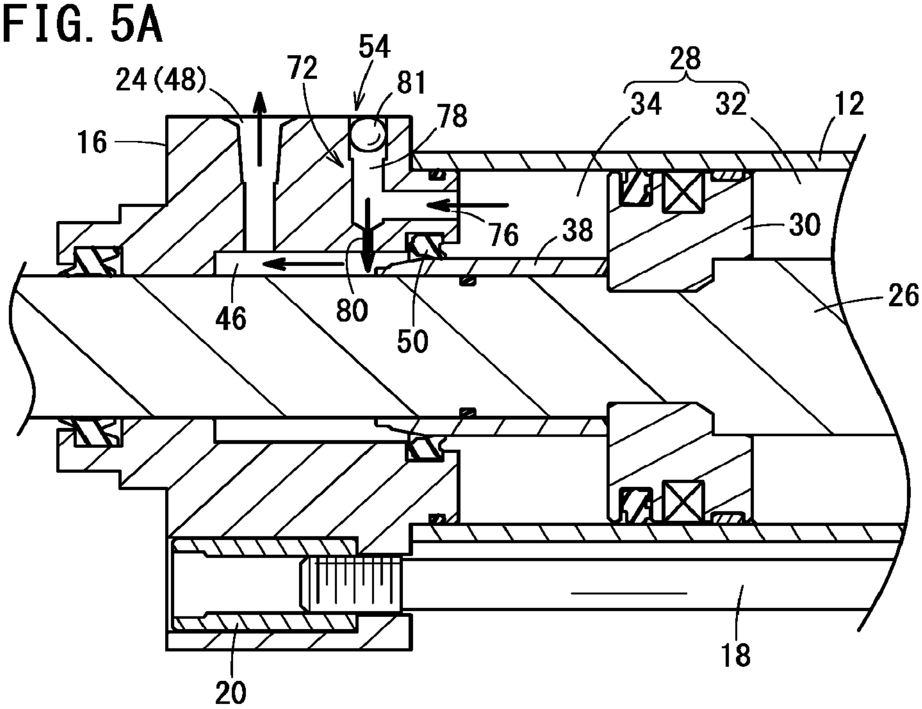
FIGS. 5A and 5B are a cross-sectional views of principal components showing operations of the gas cylinder shown in FIG. 1.

Next, when the rod side cushion pin 38 enters the rod cover chamber 46, and the rod side cushion pin 38 and the cushion packing 50 of the rod cover chamber 46 are placed in sliding contact with each other, the state of communication between the rod side port 24 and the rod side pressure chamber 34 via the rod cover chamber 46 is blocked. Consequently, the pressure in the rod side pressure chamber 34 increases. In this case, as shown in FIG. 5A, the gas in the rod side pressure chamber 34 is discharged from the rod side port 24 via the orifice member 72 (the two flow paths 76 and 78 and the orifice 80) and the rod cover chamber 46. If the pressure in the rod side pressure chamber 34 is less than or equal to a predetermined pressure (0.5 MPa in FIG. 7), the valve element 84 is displaced toward the second flow path 82*b* side by the biasing force of the spring member 86, and the large diameter portion 84*b* closes the connected portion between the second flow path 82*b* and the third flow path 82*c*, whereby the state of communication between the second flow path 82*b* and the third flow path 82*c* is blocked.

Next, at time t2, in the case that the pressure in the rod side pressure chamber 34 exceeds the predetermined pressure, the valve element 84 is displaced upward (to the third flow path 82*c* side) due to the pressure in opposition to the biasing force of the spring member 86. In this case, since the slits 84*d* are formed in the large diameter portion 84*b*, when the valve element 84 is displaced upward, the gas existing in the space between the lid portion 90 and the valve element 84 escapes through the slits 84*d* to the fourth flow path 82*d* side. Consequently, the valve element 84 can be easily displaced upward.

Figure 5B:
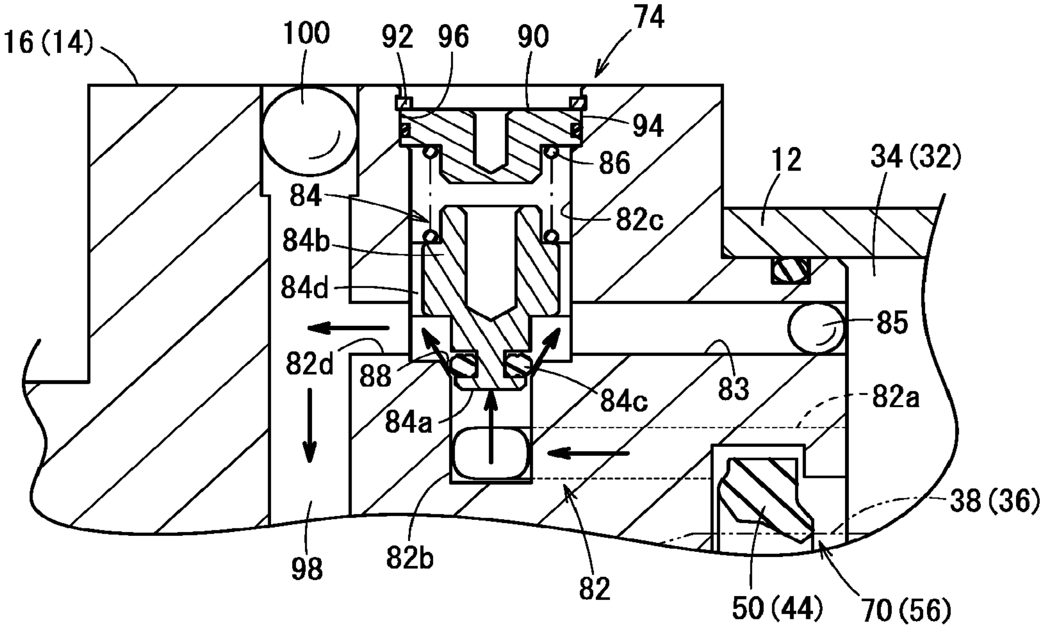

Further, the valve element 84 is a spool type valve element, and is displaced upward in accordance with the magnitude of the pressure in the rod side pressure chamber 34. In this case, as shown in FIG. 5B, the large diameter portion 84*b* separates away from the connected portion between the second flow path 82*b* and the third flow path 82*c*, and a slight gap is formed between the (small diameter portion 84*a* of) the valve element 84 and the tapered portion 88. Consequently, the second flow path 82*b* and the third flow path 82*c* communicate with each other, and as shown in FIG. 5A, the gas in the rod side pressure chamber 34 is discharged to the exterior from the rod side port 24 via the orifice member 72 and the rod cover chamber 46, and as shown in FIG. 5B, the gas is discharged from the rod side port 24 via the first flow path 82*a*, the second flow path 82*b*, the slight gap, the third flow path 82*c*, the fourth flow path 82*d*, the flow path 98, and the rod cover chamber 46. In other words, when the pressure in the rod side pressure chamber 34 exceeds the predetermined pressure, the gas in the rod side pressure chamber 34 is discharged through two routes. Moreover, by the valve element 84 being displaced upward, the spring member 86 is contracted.

Figure 6:
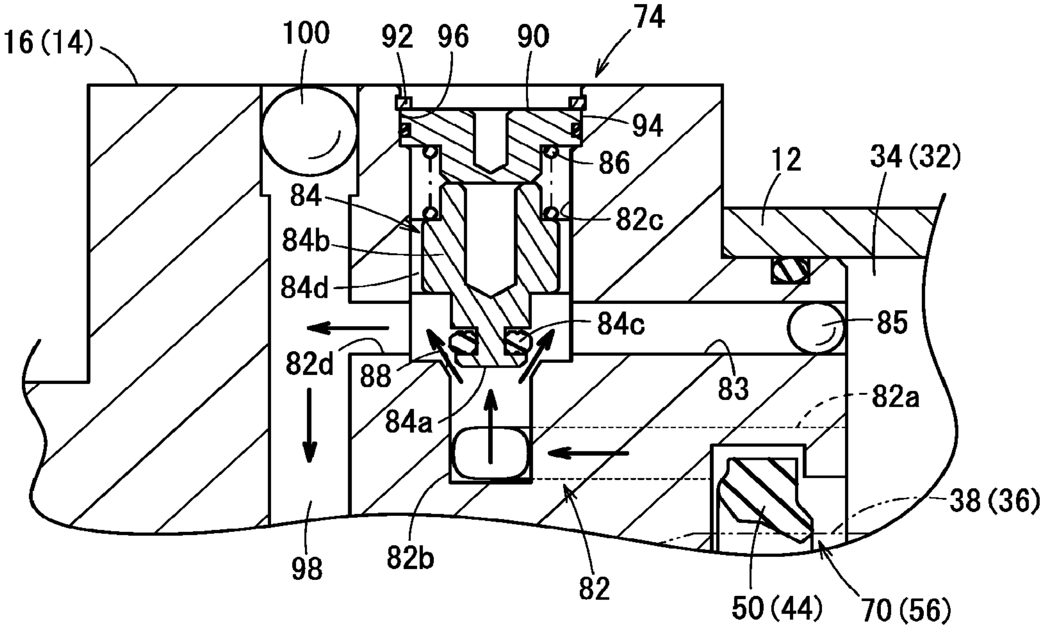
FIG. 6 is a cross-sectional view of principal components showing operations of the gas cylinder shown in FIG. 1.

Then, when the pressure in the rod side pressure chamber 34 increases further, the valve element 84 is further displaced upward, and the gap between the valve element 84 and the tapered portion 88 becomes large. More specifically, the degree of opening of the valve element 84 becomes large. As a result, as shown in FIG. 5A, the gas in the rod side pressure chamber 34 is discharged to the exterior from the rod side port 24 via the orifice member 72 and the rod cover chamber 46, and as shown in FIG. 6, the gas is discharged from the rod side port 24 via the first flow path 82*a*, the second flow path 82*b*, the enlarged gap, the third flow path 82*c*, the fourth flow path 82*d*, the flow path 98, and the rod cover chamber 46. In this case as well, the gas in the rod side pressure chamber 34 is discharged through the aforementioned two routes. Moreover, by the valve element 84 being further displaced upward, the spring member 86 is further contracted.

In the foregoing manner, in a time block from time t2 to time t3, the degree of opening of the valve element 84 changes in accordance with the magnitude of the pressure in the rod side pressure chamber 34, whereby the pressure can be suppressed to be less than or equal to the predetermined pressure, and the piston 30 can be brought in closer proximity to the stroke terminal end side. As a result, at time t3, when the piston 30 has arrived at the stroke terminal end, the impact force that acts on the piston 30 can be reduced.

1.3 Effects of the First Embodiment

In this manner, the gas cylinder 10A according to the first embodiment comprises the cylinder tube 12 in which the cylinder chamber 28 is formed, the first cover (one of the head cover 14 or the rod cover 16) that closes the one end of the cylinder tube 12, the second cover (the other of the head cover 14 and the rod cover 16) that closes the other end of the cylinder tube 12, the piston 30 that partitions the cylinder chamber 28 into the first pressure chamber (one of the head side pressure chamber 32 or the rod side pressure chamber 34) on the first cover side and a second pressure chamber (the other of the head side pressure chamber 32 and the rod side pressure chamber 34) on the second cover side, and that slides in the cylinder chamber 28, the piston rod 26 connected to the piston 30, the first port (one of the head side port 22 or the rod side port 24) through which gas is supplied and discharged to and from the first pressure chamber, the second port (the other of the head side port 22 and the rod side port 24) through which gas is supplied and discharged to and from the second pressure chamber, and the cushioning mechanism (the head side cushioning mechanism 52, the rod side cushioning mechanism 54) that brakes the movement of the piston 30 when the piston 30 comes to a stop at a stroke end (the stroke starting end or the stroke terminal end) at least on the first cover side.

The cushioning mechanism includes the communication blocking portions 56 and 70 that block the state of communication between the first pressure chamber and the first port when the piston 30 comes close to the stroke end, the orifice members 58 and 72 that are disposed in the first cover and that discharge gas in the first pressure chamber, and the discharge flow rate adjustment parts 60 and 74 that are disposed in the first cover and that discharge the gas from the first pressure chamber in cooperation with the orifice members 58 and 72, in the case that the pressure in the first pressure chamber exceeds the predetermined pressure.

The discharge flow rate adjustment parts 60 and 74 include the discharge flow path 82 formed inside the first cover and configured to discharge the gas in the first pressure chamber, the spool type valve element 84 disposed midway along the discharge flow path 82, and the spring member 86 (elastic body) that biases the valve element 84 toward the upstream side of the discharge flow path 82.

In addition, in the case that the pressure is less than or equal to the predetermined pressure, the valve element 84 blocks the state of communication between the upstream side (the second flow path 82*b*) and the downstream side (the third flow path 82*c*) of the discharge flow path 82 by the biasing force of the spring member 86. On the other hand, in the case that the pressure exceeds the predetermined pressure, the valve element 84 is displaced by the pressure toward the downstream side of the discharge flow path 82 in opposition to the biasing force, to allow the upstream side and the downstream side of the discharge flow path 82 to communicate with each other.

In the case that the pressure in the first pressure chamber (the cushion chamber) is less than or equal to the predetermined pressure, since the valve element 84 blocks the state of communication between the upstream side and the downstream side of the discharge flow path 82 due to the biasing force from the spring member 86, the gas in the first pressure chamber is discharged only through the orifice members 58 and 72. Further, in the case that the pressure in the first pressure chamber exceeds the predetermined pressure, the valve element 84 is displaced by the pressure in opposition to the biasing force, and allows the upstream side and the downstream side of the discharge flow path 82 to communicate with each other, whereby the gas in the first pressure chamber is discharged through the orifice members 58 and 72, and is also discharged through the discharge flow path 82.

In this manner, in the case that the pressure exceeds the predetermined pressure, the gas in the first pressure chamber is discharged through two routes. Consequently, since the gas in the first pressure chamber is discharged in a short time period, the piston 30 can be made to arrive at the stroke end rapidly and smoothly. As a result, while avoiding the occurrence of a bouncing phenomenon, the responsiveness of the gas cylinder 10A can be improved.

Further, due to the valve element 84 being displaced by a balance between the biasing force of the spring member 86 and the pressure in the first pressure chamber, the upstream side and the downstream side of the discharge flow path 82 are switched into a state of communication or into a blocked state. Consequently, manual adjustment of the valve element 84 is rendered unnecessary. More specifically, since the valve element 84 is a spool type valve element, in the case that the upstream side and the downstream side of the discharge flow path 82 are placed in communication, the degree of opening of the valve element 84 can be gradually changed in accordance with the magnitude of the pressure in the first pressure chamber.

Accordingly, with the gas cylinder 10A, the need for manual adjustment of the valve element 84 is rendered unnecessary, and it becomes possible to realize a smooth arrival of the piston 30 at the stroke end and alleviate shocks on the piston 30 while suppressing the occurrence of a bouncing phenomenon.

In this instance, the discharge flow path 82 is formed from the first flow path 82*a* that communicates with the first pressure chamber, the second flow path 82*b* that is connected to the downstream side of the first flow path 82*a*, the third flow path 82*c* that is connected to the downstream side of the second flow path 82*b* and is greater in diameter than the second flow path 82*b*, and the fourth flow path 82*d* that is connected to the downstream side of the third flow path 82*c* and communicates with the exterior. The valve element 84 is formed from the small diameter portion 84*a* that is capable of being inserted into the second flow path 82*b*, and the large diameter portion 84*b*, which is connected to the small diameter portion 84*a*, is arranged in the third flow path 82*c*, and has a diameter which is greater than the diameter of the small diameter portion 84*a*. The spring member 86 is arranged in the third flow path 82*c*, and biases the large diameter portion 84*b* toward the second flow path 82*b* side.

In addition, in the case that the pressure is less than or equal to the predetermined pressure, the valve element 84 is displaced toward the second flow path 82*b* side by the biasing force of the spring member 86, and the large diameter portion 84*b* closes the connected portion between the second flow path 82*b* and the third flow path 82*c*, whereby the state of communication between the second flow path 82*b* and the third flow path 82*c* is blocked. Further, in the case that the pressure exceeds the predetermined pressure, the valve element 84 is displaced by the pressure toward the third flow path 82*c* side in opposition to the biasing force, whereby the large diameter portion 84*b* separates away from the connected portion, and the second flow path 82*b* and the third flow path 82*c* are allowed to communicate with each other.

Consequently, the occurrence of a bouncing phenomenon can be effectively suppressed, and a smooth arrival of the piston 30 at the stroke end can be easily realized. Further, since the pressure of the gas from the first pressure chamber is received by the small diameter portion 84*a*, and the biasing force from the spring member 86 is received by the large diameter portion 84*b*, it becomes possible to ensure a biasing force (spring force) that overcomes the pressure of the gas. More specifically, since the pressure receiving area of the small diameter portion 84*a* for the gas becomes smaller, the thrust from the gas that acts on the valve element 84 is reduced. Consequently, even if the spring member 86 is small in scale, the spring force can be ensured.

Further, the outer peripheral surface of the small diameter portion 84*a* is provided with the seal member 84*c* which is in sliding contact with the location of the second flow path 82*b* on the inner peripheral surface of the first cover. The tapered portion 88, the diameter of which is reduced from the third flow path 82*c* toward the second flow path 82*b*, is formed at the location of the connected portion on the inner peripheral surface of the first cover. As a result, when the valve element 84 moves in the direction of displacement, since wear, damage or the like to the seal member 84*c* due to contact with the connected portion is avoided, the useful lifetime of the gas cylinder 10A including the valve element 84 can be extended. Further, by forming the tapered portion 88, the degree of opening of the valve element 84 can be gradually changed when the valve element 84 is displaced according to the pressure of the gas.

Further, the slits 84*d* are formed along the direction of displacement of the valve element 84 on the outer peripheral surface of the large diameter portion 84*b*. Consequently, when the valve element 84 is displaced toward the third flow path 82*c* side (when the valve element 84 opens), since the gas existing in the space between the lid portion 90 and the valve element 84 escapes through the slits 84*d*, the valve element 84 can be easily displaced toward the third flow path 82*c* side.

Further, by providing the slits 84*d*, the pressure receiving area of the large diameter portion 84*b* for the gas in the first pressure chamber becomes small. Consequently, when the valve element 84 is displaced toward the second flow path 82*b* side (when the valve element 84 closes), since the force (resistance) that the large diameter portion 84*b* receives from the gas becomes small, the valve element 84 can be made to slide smoothly to the second flow path 82*b* side.

Furthermore, by providing the slits 84*d*, even if rattling occurs on the large diameter portion 84*b* or on the inner peripheral surface of the first cover that forms the third flow path 82*c*, the influence of such rattling on the movement of the valve element 84 can be reduced.

Further, the third flow path 82*c* communicates with the exterior and is closed by the lid portion 90, and the spring member 86 is inserted between the lid portion 90 and the large diameter portion 84*b*. As a result, replacement of the spring member 86 is facilitated.

In this case, the male thread 94 is formed on the outer peripheral surface of the lid portion 90, and the female thread 96, which is screwed-engaged with the male thread 94, is formed at the location of the lid portion 90 on the inner peripheral surface of the first cover that forms the third flow path 82*c*. Consequently, by turning the lid portion 90, it becomes possible to easily adjust the biasing force (spring force) of the spring member 86.

Further, since the orifice members 58 and 72 and the discharge flow rate adjustment parts 60 and 74 are collectively disposed inside the first cover on one side portion with respect to the piston rod 26, three of the four surfaces of the first cover can serve as a mounting surface for the gas cylinder 10A. As a result, it becomes possible for a plurality of the gas cylinders 10A to be disposed collectively in a limited space. Further, the gas cylinder 10A can be easily manufactured. Furthermore, it is possible to realize a gas cylinder 10A by which compatibility of the external dimensions with currently available products is maintained.

2. Second Embodiment

Next, a description will be given with reference to FIGS. 8 to 10 concerning a gas cylinder 10B according to a second embodiment. Concerning the same constituent elements as those of the gas cylinder 10A according to the first embodiment (see FIGS. 1 to 7), these elements are designated by the same reference numerals, and detailed description of thereof will be omitted.

The gas cylinder 10B according to the second embodiment differs from the gas cylinder 10A according to the first embodiment, in that the orifices 66 and 80 and the second flow path 82*b* communicate with each other substantially coaxially, and the fourth flow path 82*d* communicates with the first port (the head side port 22 or the rod side port 24). Accordingly, in the gas cylinder 10B according to the second embodiment, the orifices 66 and 80, the second flow path 82*b*, and the third flow path 82*c* are formed substantially coaxially, and the first flow path 82*a* and the second flow path 82*b* are used as flow paths for the orifice members 58 and 72. In accordance with such features, in comparison with the gas cylinder 10A, the number of flow paths in the first cover (the head cover 14 or the rod cover 16) becomes fewer in number, and manufacturing of the first cover is facilitated.

Operations of the gas cylinder 10B according to the second embodiment are basically the same as the operations of the gas cylinder 10A according to the first embodiment, however, when the piston 30 comes close to the stroke end (the stroke starting end or the stroke terminal end), in the case that the pressure in the first pressure chamber (the head side pressure chamber 32 or the rod side pressure chamber 34) is less than or equal to the predetermined pressure, the gas in the first pressure chamber is discharged through the first flow path 82*a*, the second flow path 82*b*, the orifices 66 and 80, the first cover chamber (the head cover chamber 40 or the rod cover chamber 46), and the first port. On the other hand, in the case that the pressure in the first pressure chamber exceeds the predetermined pressure, the valve element 84 is displaced upward, and the second flow path 82*b* and the third flow path 82*c* are placed in communication, whereby the gas in the first pressure chamber is discharged to the exterior through the first to fourth flow paths 82*a* to 82*d* and the first port, in addition to the above route.

Therefore, also in the gas cylinder 10B according to the second embodiment, the same advantageous effects as those of the gas cylinder 10A according to the first embodiment can be obtained. Further, in the case of the second embodiment, in comparison with the first embodiment, since the number of the flow paths in the first cover become fewer, the workload required for drilling holes in the first cover is reduced, and manufacturing of the gas cylinder 10B is facilitated.

Furthermore, in the second embodiment, since the fourth flow path 82*d* communicates with the first port, the gas in the first pressure chamber is rapidly discharged, thereby making it possible to reduce the pressure in the first pressure chamber. As a result, the responsiveness of the gas cylinder 10B can be improved.

3. Third Embodiment

Figure 11A:
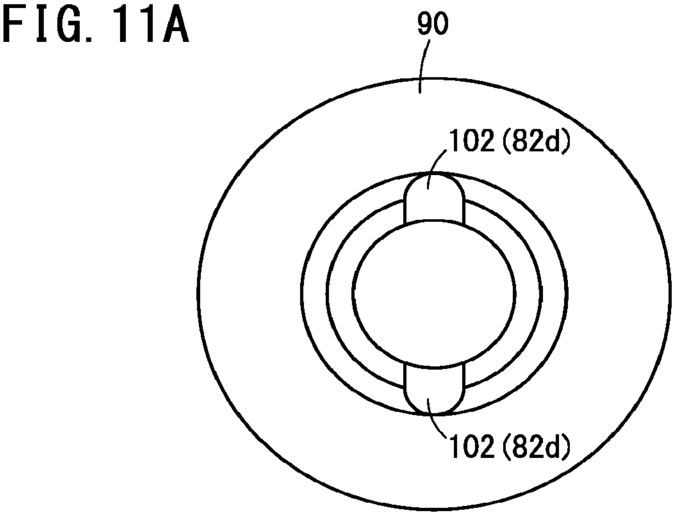
FIG. 11A is a plan view of a lid portion of a gas cylinder according to a third embodiment.
Figure 11B:
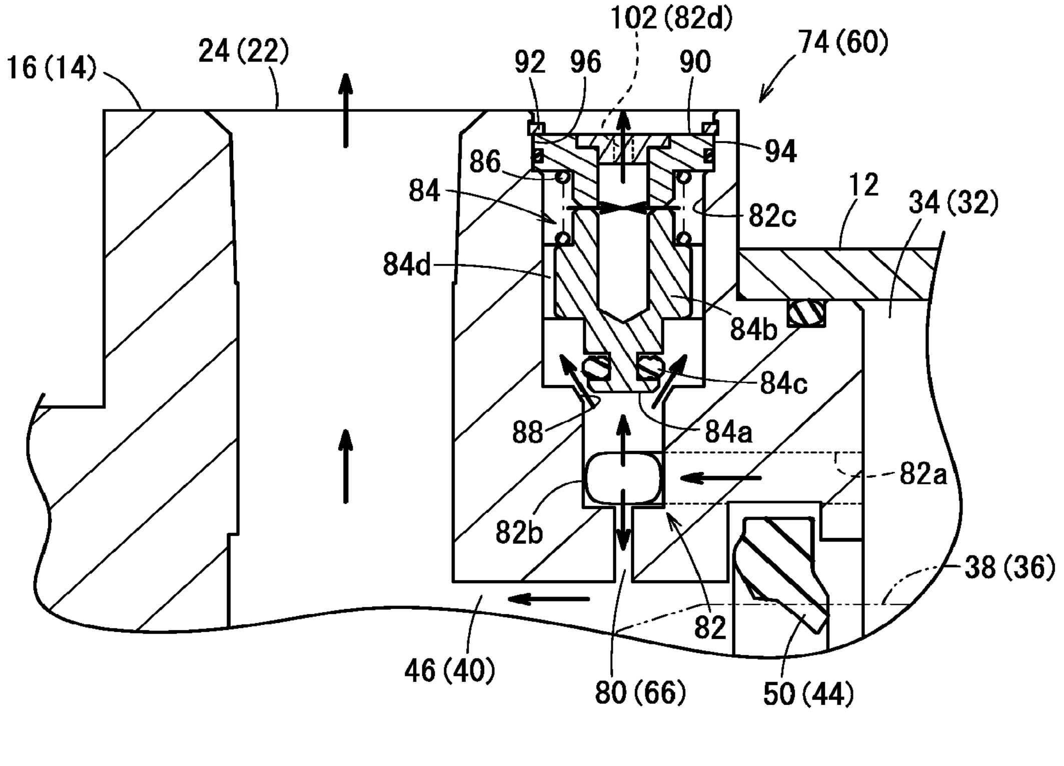
FIG. 11B is a cross-sectional view of principal components showing operations of the gas cylinder.

Next, a description will be given with reference to FIGS. 11A and 11B concerning a gas cylinder 10C according to a third embodiment.

Figure 8:
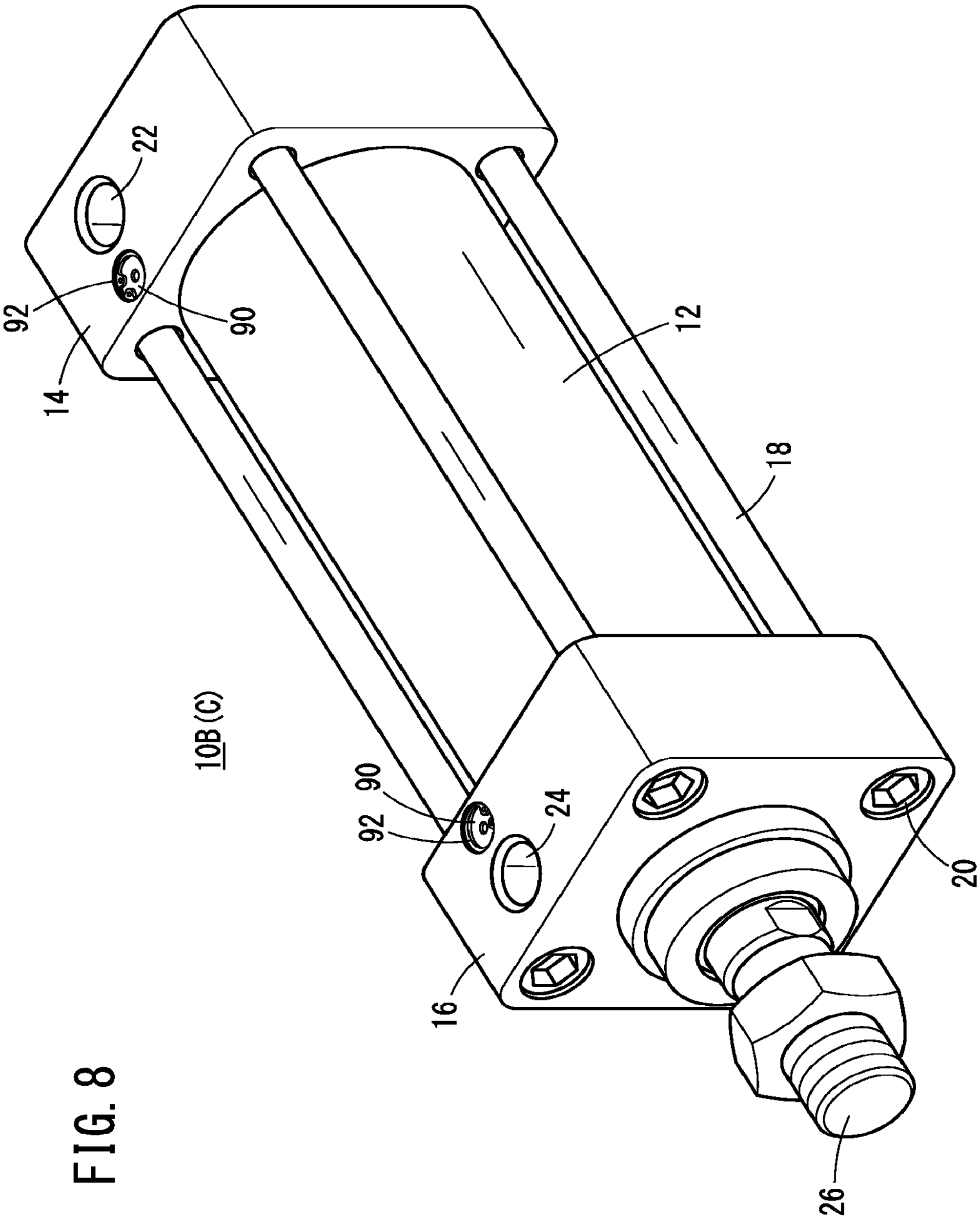
FIG. 8 is a perspective view of a gas cylinder according to a second embodiment.
Figure 9A:
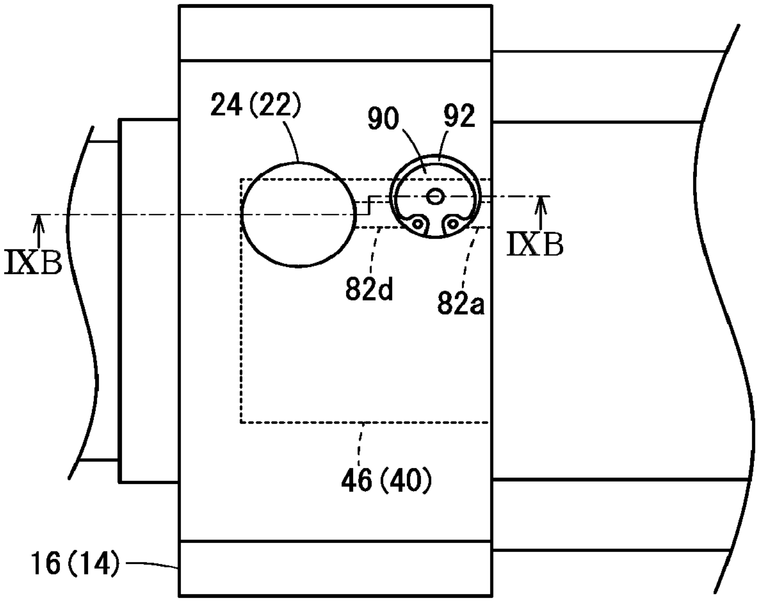
FIG. 9A is a partial plan view of the vicinity of a rod cover of the gas cylinder shown in FIG. 8.
Figure 9B:
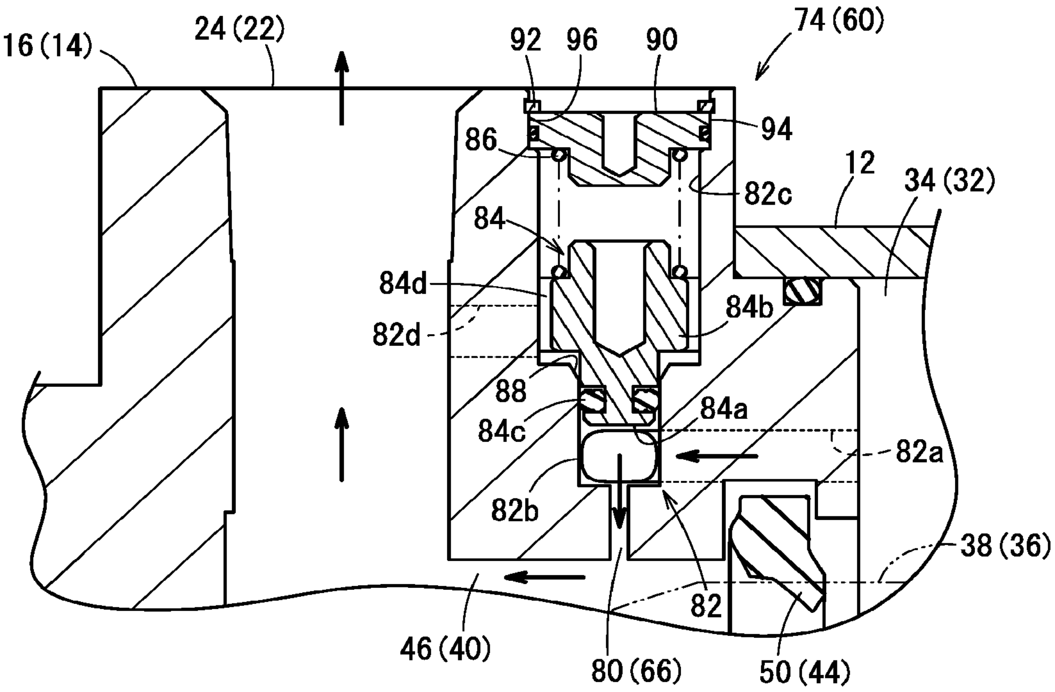
FIG. 9B is a cross-sectional view of principal components taken along line IXB-IXB of FIG. 9A.
Figure 10:
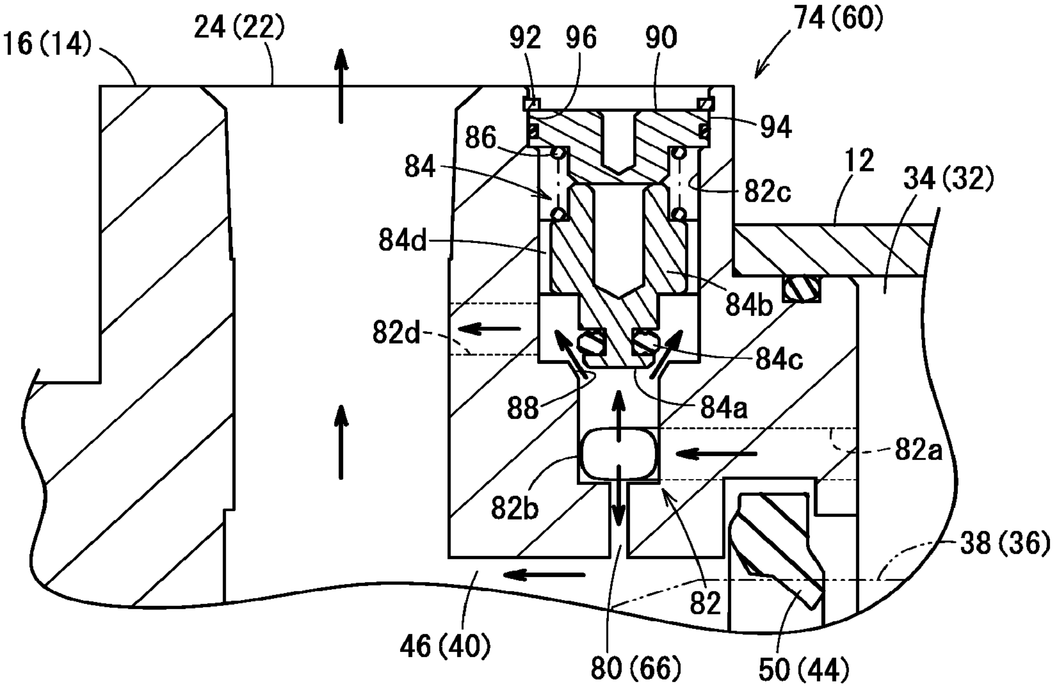
FIG. 10 is a cross-sectional view of principal components showing operations of the gas cylinder shown in FIG. 8.

The gas cylinder 10C according to the third embodiment, in terms of its external appearance, is substantially the same as the gas cylinder 10B according to the second embodiment (see FIGS. 8 to 10). However, in the gas cylinder 10C according to the third embodiment, in the lid portion 90, a flow path 102 is formed that communicates with the exterior. Such a flow path is formed as a fourth flow path 82*d* that allows the third flow path 82*c* to communicate with the exterior. Specifically, according to the third embodiment, a flow path for discharging the gas is not formed between the third flow path 82*c* and the first port (the head side port 22 or the rod side port 24). Moreover, in FIG. 11A and FIG. 11B, a case is illustrated in which two fourth flow paths 82*d* are formed in the lid portion 90.

Operations of the gas cylinder 10C according to the third embodiment are basically the same as the operations of the gas cylinder 10B according to the second embodiment, however, in the case that the pressure in the first chamber exceeds the predetermined pressure, the valve element 84 is displaced upward, and the second flow path 82*b* and the third flow path 82*c* are placed in communication. In this case, since the fourth flow path 82*d* is formed in the lid portion 90, the gas flowing into the third flow path 82*c* is discharged to the exterior (the atmosphere) through the slits 84*d* and the fourth flow path 82*d*.

Therefore, also in the gas cylinder 10C according to the third embodiment, the same advantageous effects as those of the gas cylinders 10A and 10B according to the first and second embodiments can be obtained. Further, since a configuration is provided in which the gas flowing into the third flow path 82*c* is discharged to the exterior (the atmosphere) through the slits 84*d* and the fourth flow path 82*d*, the valve element 84 is displaced to the third flow path 82*c* side with a lower pressure, the gas in the first pressure chamber is smoothly discharged, and the pressure in the first pressure chamber is rapidly reduced. As a result, the responsiveness of the gas cylinder 10C is improved. Further, since there is no need to form a flow path for discharging the gas between the third flow path 82*c* and the first port, the workload required for drilling holes in the first cover is reduced, and manufacturing of the gas cylinder 10C is facilitated.

It should be noted that the present invention is not limited to the embodiments described above, and it goes without saying that various configurations could be adopted therein based on the content disclosed in the present specification.

The invention claimed is:

1. A gas cylinder, comprising:

a cylinder tube in which a cylinder chamber is formed;

a first cover configured to close one end of the cylinder tube;

a second cover configured to close another end of the cylinder tube;

a piston configured to partition the cylinder chamber into a first pressure chamber on a side of the first cover and a second pressure chamber on a side of the second cover, and to slide in the cylinder chamber;

a piston rod connected to the piston;

a first port configured to supply and discharge gas to and from the first pressure chamber;

a second port configured to supply and discharge gas to and from the second pressure chamber; and a cushioning mechanism configured to brake movement of the piston when the piston comes to a stop at a stroke end at least on the side of the first cover, wherein the cushioning mechanism includes:

a seal configured to block a state of communication between the first pressure chamber and the first port when the piston comes close to the stroke end;

an orifice member disposed in the first cover and configured to discharge gas in the first pressure chamber to an exterior via the first port; and a discharge flow rate adjustment part disposed in the first cover and configured to discharge the gas from the first pressure chamber in cooperation with the orifice member, in a case that a pressure in the first pressure chamber exceeds a predetermined pressure, the discharge flow rate adjustment part includes a discharge flow path formed inside the first cover and configured to discharge the gas in the first pressure chamber, a spool valve element disposed midway along the discharge flow path, and an elastic body configured to bias the spool valve element toward an upstream side of the discharge flow path, the discharge flow path is formed from a first flow path configured to communicate with the first pressure chamber, a second flow path connected to a downstream side of the first flow path, a third flow path connected to a downstream side of the second flow path and having a larger diameter than the second flow path, and a fourth flow path connected to the third flow path and configured to communicate with the exterior, the spool valve element is formed from a small diameter portion configured to be inserted into the second flow path, and a large diameter portion that is connected to the small diameter portion, is disposed in the third flow path, and has a larger diameter than the small diameter portion, the elastic body is a spring member disposed in the third flow path and configured to bias the large diameter portion toward a side of the second flow path, in a case that the pressure is less than or equal to the predetermined pressure, the spool valve element is displaced toward the side of the second flow path by a biasing force of the spring member, and the large diameter portion closes a connected portion between the second flow path and the third flow path, whereby a state of communication between the second flow path and the third flow path is blocked, and in the case that the pressure exceeds the predetermined pressure, the spool valve element is displaced by the pressure toward a side of the third flow path in opposition to the biasing force, whereby the large diameter portion separates away from the connected portion, and the second flow path and the third flow path are allowed to communicate with each other.

2. The gas cylinder according to claim 1, wherein:

an outer peripheral surface of the small diameter portion is provided with a seal member in sliding contact with a location of the second flow path on an inner peripheral surface of the first cover; and a tapered portion, a diameter of which is reduced from the third flow path toward the second flow path, is formed at a location of the connected portion on the inner peripheral surface.

3. The gas cylinder according to claim 1, wherein a slit is formed on an outer peripheral surface of the large diameter portion along a direction in which the spool valve element is displaced.

4. The gas cylinder according to claim 1, wherein:

the third flow path communicates with the exterior and is closed by a lid portion; and the spring member is inserted between the lid portion and the large diameter portion.

5. The gas cylinder according to claim 4, wherein:

a male thread is formed on an outer peripheral surface of the lid portion; and a female thread that is screwed-engaged with the male thread is formed at a location of the lid portion on an inner peripheral surface of the first cover.

6. The gas cylinder according to claim 4, wherein:

the first port is formed in the first cover;

the second port is formed in the second cover; and the orifice member includes an orifice configured to discharge, to the first port, gas flowing from the first pressure chamber through the first flow path and the second flow path.

7. The gas cylinder according to claim 6, wherein the fourth flow path connects the third flow path and the first port.

8. The gas cylinder according to claim 6, wherein the fourth flow path is formed in the lid portion, and allows the third flow path to communicate with the exterior.

9. The gas cylinder according to claim 1, wherein the orifice member and the discharge flow rate adjustment part are disposed collectively inside the first cover on one side portion with respect to the piston rod.

10. A gas cylinder, comprising:

a cylinder tube in which a cylinder chamber is formed;

a first cover configured to close one end of the cylinder tube;

a second cover configured to close another end of the cylinder tube;

a piston configured to partition the cylinder chamber into a first pressure chamber on a side of the first cover and a second pressure chamber on a side of the second cover, and to slide in the cylinder chamber;

a piston rod connected to the piston;

a first port configured to supply and discharge gas to and from the first pressure chamber;

a second port configured to supply and discharge gas to and from the second pressure chamber; and a cushioning mechanism configured to brake movement of the piston when the piston comes to a stop at a stroke end at least on the side of the first cover, wherein the cushioning mechanism includes:

a seal configured to block a state of communication between the first pressure chamber and the first port when the piston comes close to the stroke end;

an orifice member disposed in the first cover and configured to discharge gas in the first pressure chamber; and a discharge flow rate adjustment part disposed in the first cover and configured to discharge the gas from the first pressure chamber in cooperation with the orifice member, in a case that a pressure in the first pressure chamber exceeds a predetermined pressure, the discharge flow rate adjustment part includes a discharge flow path formed inside the first cover and configured to discharge the gas in the first pressure chamber, a spool valve element disposed midway along the discharge flow path, and an elastic body configured to bias the spool valve element toward an upstream side of the discharge flow path, the discharge flow path is formed from a first flow path configured to communicate with the first pressure chamber, a second flow path connected to a downstream side of the first flow path, a third flow path connected to a downstream side of the second flow path and having a larger diameter than the second flow path, and a fourth flow path connected to the third flow path and configured to communicate with the exterior, the spool valve element is formed from a small diameter portion configured to be inserted into the second flow path, and a large diameter portion that is connected to the small diameter portion, is disposed in the third flow path, and has a larger diameter than the small diameter portion, the elastic body is a spring member disposed in the third flow path and configured to bias the large diameter portion toward a side of the second flow path, in a case that the pressure is less than or equal to the predetermined pressure, the spool valve element is displaced toward the side of the second flow path by a biasing force of the spring member, and the large diameter portion closes a connected portion between the second flow path and the third flow path, whereby a state of communication between the second flow path and the third flow path is blocked, in the case that the pressure exceeds the predetermined pressure, the spool valve element is displaced by the pressure toward a side of the third flow path in opposition to the biasing force, whereby the large diameter portion separates away from the connected portion, and the second flow path and the third flow path are allowed to communicate with each other, and a slit is formed on an outer peripheral surface of the large diameter portion along a direction in which the spool valve element is displaced.

11. A gas cylinder, comprising:

a cylinder tube in which a cylinder chamber is formed;

a first cover configured to close one end of the cylinder tube;

a second cover configured to close another end of the cylinder tube;

a piston configured to partition the cylinder chamber into a first pressure chamber on a side of the first cover and a second pressure chamber on a side of the second cover, and to slide in the cylinder chamber;

a piston rod connected to the piston;

a first port configured to supply and discharge gas to and from the first pressure chamber;

a second port configured to supply and discharge gas to and from the second pressure chamber; and a cushioning mechanism configured to brake movement of the piston when the piston comes to a stop at a stroke end at least on the side of the first cover, wherein the cushioning mechanism includes:

a seal configured to block a state of communication between the first pressure chamber and the first port when the piston comes close to the stroke end;

an orifice member disposed in the first cover and configured to discharge gas in the first pressure chamber; and a discharge flow rate adjustment part disposed in the first cover and configured to discharge the gas from the first pressure chamber in cooperation with the orifice member, in a case that a pressure in the first pressure chamber exceeds a predetermined pressure, the discharge flow rate adjustment part includes a discharge flow path formed inside the first cover and configured to discharge the gas in the first pressure chamber, a spool valve element disposed midway along the discharge flow path, and an elastic body configured to bias the spool valve element toward an upstream side of the discharge flow path, the discharge flow path is formed from a first flow path configured to communicate with the first pressure chamber, a second flow path connected to a downstream side of the first flow path, a third flow path connected to a downstream side of the second flow path and having a larger diameter than the second flow path, and a fourth flow path connected to the third flow path and configured to communicate with the exterior, the spool valve element is formed from a small diameter portion configured to be inserted into the second flow path, and a large diameter portion that is connected to the small diameter portion, is disposed in the third flow path, and has a larger diameter than the small diameter portion, the elastic body is a spring member disposed in the third flow path and configured to bias the large diameter portion toward a side of the second flow path, in a case that the pressure is less than or equal to the predetermined pressure, the spool valve element is displaced toward the side of the second flow path by a biasing force of the spring member, and the large diameter portion closes a connected portion between the second flow path and the third flow path, whereby a state of communication between the second flow path and the third flow path is blocked, in the case that the pressure exceeds the predetermined pressure, the spool valve element is displaced by the pressure toward a side of the third flow path in opposition to the biasing force, whereby the large diameter portion separates away from the connected portion, and the second flow path and the third flow path are allowed to communicate with each other, the third flow path communicates with the exterior and is closed by a lid portion;

the spring member is inserted between the lid portion and the large diameter portion, the first port is formed in the first cover;

the second port is formed in the second cover; and the orifice member includes an orifice configured to discharge, to the first port, gas flowing from the first pressure chamber through the first flow path and the second flow path, and the fourth flow path is formed in the lid portion, and allows the third flow path to communicate with the exterior.

* * * * *